US010063498B2

(12) United States Patent
Lee

(10) Patent No.: US 10,063,498 B2
(45) Date of Patent: Aug. 28, 2018

(54) METHOD AND APPARATUS FOR SENDING AND RECEIVING MESSAGES

(71) Applicant: Samsung Electronics Co., Ltd., Suwon-si-Gyeonggi-do (KR)

(72) Inventor: Eun-Yeung Lee, Chilgok-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 14/197,927

(22) Filed: Mar. 5, 2014

(65) Prior Publication Data

US 2014/0258426 A1 Sep. 11, 2014

(30) Foreign Application Priority Data

Mar. 7, 2013 (KR) ........................ 10-2013-0024533

(51) Int. Cl.
*H04L 12/58* (2006.01)

(52) U.S. Cl.
CPC .......... *H04L 51/04* (2013.01); *H04L 51/063* (2013.01); *H04L 51/16* (2013.01); *H04L 51/18* (2013.01)

(58) Field of Classification Search
CPC ......... H04L 51/16; H04L 51/18; H04L 51/04; H04L 51/063
See application file for complete search history.

(56) References Cited

U.S. PATENT DOCUMENTS

| 5,870,548 | A | * | 2/1999 | Nielsen | G06Q 10/107 379/93.24 |
| 6,665,531 | B1 | * | 12/2003 | Soderacka | H04W 4/14 340/7.21 |
| 7,305,627 | B2 | * | 12/2007 | Tannenbaum | G06Q 10/107 715/751 |
| 7,428,702 | B1 | | 9/2008 | Cervantes et al. | |
| 7,543,033 | B2 | * | 6/2009 | Vincent | H04L 51/04 709/203 |
| 2001/0005859 | A1 | * | 6/2001 | Okuyama | H04L 29/00 709/245 |
| 2003/0023689 | A1 | * | 1/2003 | Brown | H04L 12/1831 709/206 |
| 2005/0124360 | A1 | * | 6/2005 | Choi | H04W 4/14 455/466 |
| 2005/0278413 | A1 | * | 12/2005 | Tannenbaum | G06Q 10/107 709/202 |
| 2006/0149825 | A1 | * | 7/2006 | Kim | H04L 51/04 709/207 |
| 2006/0173966 | A1 | * | 8/2006 | Jennings, III | H04L 51/30 709/207 |
| 2007/0124387 | A1 | | 5/2007 | Galloway | |
| 2008/0320086 | A1 | * | 12/2008 | Callanan | H04L 51/063 709/206 |

(Continued)

FOREIGN PATENT DOCUMENTS

KR 2006-0088395 A 8/2006
KR 10-2008-0098233 A 11/2008

*Primary Examiner* — Abdulkader M Alriyashi
(74) *Attorney, Agent, or Firm* — Jefferson IP Law, LLP

(57) ABSTRACT

A method for sending an Instant Message (IM) to a receiving terminal by a sending terminal is provided. The method includes generating an IM including string data entered by a user, sending the IM to the receiving terminal, receiving a modification of the string data included in the IM, and applying the modified string data to the IM.

12 Claims, 13 Drawing Sheets

(56) References Cited

U.S. PATENT DOCUMENTS

| | | | |
|---|---|---|---|
| 2009/0043848 A1* | 2/2009 | Kordun | H04L 51/04 709/205 |
| 2010/0011080 A1* | 1/2010 | Kordun | H04L 51/04 709/206 |
| 2010/0131599 A1* | 5/2010 | Giovannelli | H04L 51/04 709/206 |
| 2011/0047222 A1* | 2/2011 | Farrell | G06Q 10/00 709/206 |
| 2012/0278401 A1* | 11/2012 | Meisels | G06F 17/24 709/206 |

* cited by examiner

METHOD AND APPARATUS FOR SENDING AND RECEIVING MESSAGES

CROSS-REFERENCE TO RELATED APPLICATION(S)

This application claims the benefit under 35 U.S.C. § 119(a) of a Korean patent application filed on Mar. 7, 2013 in the Korean Intellectual Property Office and assigned Serial No. 10-2013-0024533, the entire disclosure of which is hereby incorporated by reference.

TECHNICAL FIELD

The present disclosure relates to a method and apparatus for sending and receiving messages. More particularly, the present disclosure relates to a method and apparatus for modifying sent messages.

BACKGROUND

In recent years, the services and add-ons provided by mobile devices have been gradually diversified and increased in number. In order to increase the utility value of these mobile devices and satisfy various needs of the users, a variety of applications, which can run in the mobile devices, have been developed.

Applications that can be stored and executed in a mobile device may be classified into basic applications which are developed by the device manufacturer and installed in the mobile device, and additional applications which are downloaded into the mobile device from the application sales websites over the Internet. The additional applications may be developed by the general developers, and registered in the application sales websites. Therefore, anyone can freely sell their developed applications on the application sales websites to users of the mobile devices. At present, therefore, tens to hundreds of thousands of free or paid applications can be provided to the mobile devices depending on their device specifications.

In this environment, not only the messaging applications offered by the telecommunications carriers, but also the messaging applications provided by various private operators have been widely adopted, increasingly activating the use of messaging services.

In some cases, a user may enter characters incorrectly or mistype characters while enjoying a messaging service. These mistyped characters may be found and corrected by the user, while the user is writing the message. Occasionally, however, the user may find the mistyped characters after sending the message to a receiving terminal.

If the user finds the mistyped characters after sending the message, he/she cannot correct the message since the message has already been sent to the receiving terminal.

In order to address these and other problems, numerous efforts have been made to correct messages. However, the messages may be forcibly corrected at the request of a sending terminal without considering the situation of the receiving terminal. In this case, the time at which the message is sent and received may be modified due to the correction of the message.

If a message received at a receiving terminal is forcibly corrected at the request of a sending terminal, a user of the receiving terminal may feel the discomfort as the contents stored in his/her terminal are modified contrary to his/her intentions. In some cases, the user of the sending terminal may abuse these features. In addition, if the time at which the message is sent and received is modified due to the correction of the message, the flow of the contents of interactive messages may be in disorder due to a change in the arrangement of sent/received messages which are chronologically sorted.

The above information is presented as background information only to assist with an understanding of the present disclosure. No determination has been made, and no assertion is made, as to whether any of the above might be applicable as prior art with regard to the present disclosure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a message sending/receiving method and apparatus capable of modifying a sent message more easily and stably.

In accordance with an aspect of the present disclosure, a method for sending an Instant Message (IM) to a receiving terminal by a sending terminal is provided. The method includes generating an IM including string data entered by a user, sending the IM to the receiving terminal, receiving a modification of the string data included in the IM, and applying the modified string data to the IM.

In accordance with another aspect of the present disclosure, a method for receiving an IM from a sending terminal by a receiving terminal is provided. The method includes receiving an IM including string data entered by a user, receiving a request for a modification of the string data included in the IM, and applying the modification-requested string data to the IM.

In accordance with further another aspect of the present disclosure, an apparatus for sending an IM to a receiving terminal is provided. The apparatus includes an IM manager configured to manage display and storage of the IM, an IM generator configured to generate an IM including string data entered by a user, an IM modification input unit configured to provide a modification environment for the IM, and to receive a modification of the string data included in the IM, and an IM modification handler configured to apply the modified string data to the IM.

In accordance with yet another aspect of the present disclosure, an apparatus for handling an IM received from a transmitting terminal is provided. The apparatus includes an IM manager configured to manage display and storage of the IM, an IM receiving handler configured to receive an IM including string data, and to determine whether the received IM includes modified string data, and an IM change handler configured to apply the modified string data to the IM.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
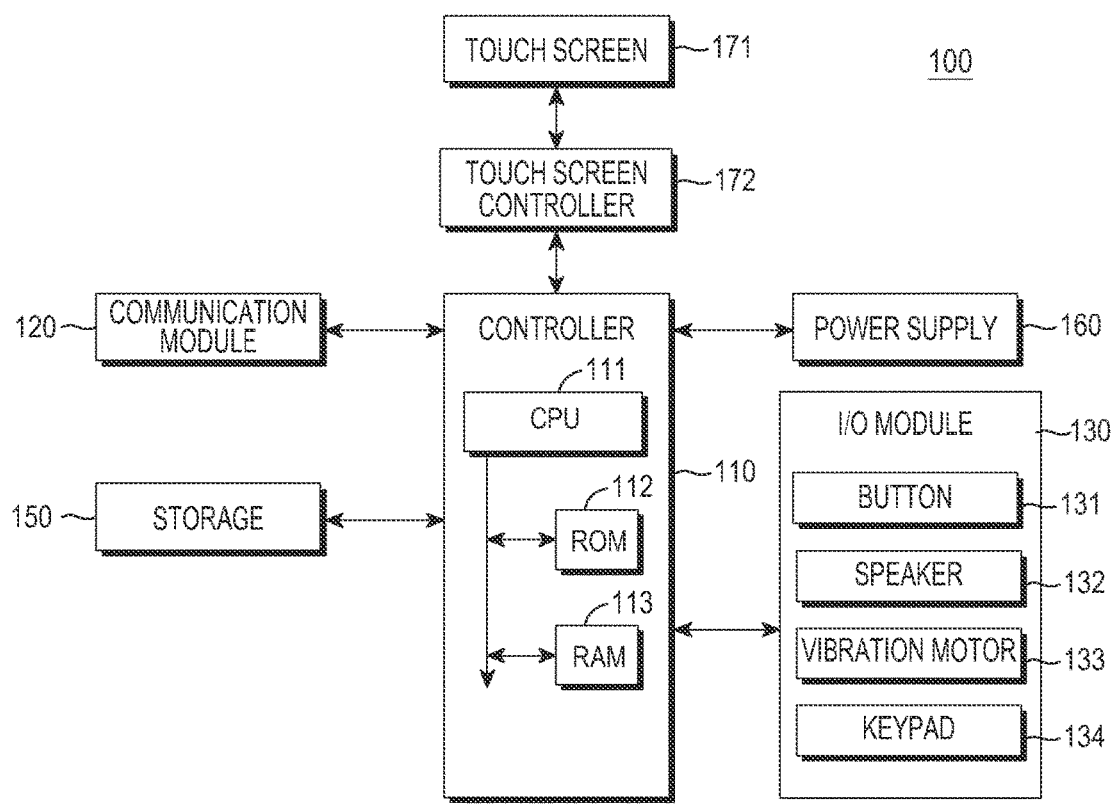
FIG. 1 is a schematic block diagram illustrating a mobile device, to which an Instant Message (IM) sending/receiving method according to an embodiment of the present disclosure.

FIG. 1 is a schematic block diagram illustrating a mobile device, to which an Instant Message (IM) sending/receiving method according to an embodiment of the present disclosure.

Referring to FIG. 1, a device (or mobile device) 100 includes a controller 110, a communication module 120, an Input/Output (I/O) module 130, a storage 150, a power supply 160, a touch screen 171, and a touch screen controller 172.

The controller 110 may include a Central Processing Unit (CPU) 111, a Read Only Memory (ROM) 112 in which a control program for control of the device 100 is stored, and a Random Access Memory (RAM) 113 which stores signals and/or data input from the outside of the device 100, and/or is used as a storage for operations performed in the device 100. The CPU 111, the ROM 112 and the RAM 113 may be interconnected via an internal bus. The controller 110 may control the communication module 120, the I/O module 130, the storage 150, the power supply 160, the touch screen 171, and the touch screen controller 172. The controller 110 may be a multi-core controller such as a single-core controller, a dual-core controller, a triple-core controller, and a quad-core controller. It will be apparent to those of ordinary skill in the art that the number of cores is subject to change depending on the characteristics of the terminal.

The communication module 120 may include at least one of a cellular module, a Wireless Local Area Network (WLAN) module and a short-range communication module.

The cellular module, under control of the controller 110, may connect the device 100 to an external device via at least one (one or multiple) antenna (not shown) by mobile communication. The cellular module transmits and receives wireless signals for voice calls, video calls, Short Message Service (SMS) messages and/or Multimedia Messaging Service (MMS) messages with a cellular phone (not shown), a smart phone (not shown), a tablet Personal Computer (PC; not shown) and/or other devices (not shown), all of which have the phone numbers entered in the device 100.

The WLAN module, under control of the controller 110, may access the Internet in the place where a wireless Access Point (AP; not shown) is installed. The WLAN module supports the WLAN Institute of Electrical and Electronics Engineers (IEEE) 802.11x standard. The WLAN module may drive a Wi-Fi Positioning System (WPS) that determines the location information of a terminal equipped with a WLAN module, using the location information provided from a wireless AP that is wirelessly connected to the WLAN module.

The short-range communication module, a module that wirelessly handles short-range communication with the device 100 under control of the controller 110, may handle the communication based on short-range communication such as Bluetooth, Infrared Data Association (IrDA), WiFi-Direct, and Near Field Communication (NFC).

The I/O module 130 may include at least one of buttons 131, a speaker 132, a vibration motor 133, and a keypad 134.

The buttons 131 may be formed on the front, side and/or rear of a housing of the device 100, and may include at least one of a power/lock button (not shown), a volume button (not shown), a menu button (not shown), a home button (not shown), a back button (not shown) and a search button (not shown).

The speaker 132, under control of the controller 110, may output sounds corresponding to various signals (for example, wireless signals, broadcast signals and the like) from the cellular module, the WLAN module and the short-range communication module to the outside of the device 100. One or multiple speakers 132 may be formed in a proper position or positions on the housing of the device 100.

The vibration motor 133, under control of the controller 110, may convert electrical signals into mechanical vibrations. One or multiple vibration motors 133 may be formed in the housing of the device 100.

The speaker 132 and the vibration motor 133 may operate depending on the settings of the volume operation mode of the device 100. For example, the volume operation mode of the device 100 may be operated as a sound mode, a vibration mode, a sound & vibration mode, or a silent mode, and may be set as any one of these modes. The controller 110 may output a signal for instructing an operation of the speaker 132 or the vibration motor 133 depending on the function performed by the device 100, based on the mode as which the volume operation mode is set.

The storage 150, under control of the controller 110, may store the signals and/or data which are input and output to correspond to operations of the communication module 120, the I/O module 130 and the touch screen 171. The storage 150 may store a control program for control of the device 100 or the controller 110, and may also store applications.

The term 'storage' as used herein may be construed to include the storage 150, the ROM 112 and RAM 113 in the controller 110, and/or a memory card (not shown; for example, an Secure Digital (SD) card, a memory stick and the like) mounted in the device 100. The storage may include a non-volatile memory, a volatile memory, a Hard Disk Drive (HDD), and/or a Solid State Drive (SSD).

The power supply 160, under control of the controller 110, may supply power to one or multiple batteries (not shown) mounted in the housing of the device 100. The one or multiple batteries (not shown) may supply power to the device 100. The power supply 160 may supply, to the device 100, the power that is received from the external power source (not shown) via a wired cable that is connected to a connector mounted in the device 100. The power supply 160 may supply, to the device 100, the power that is wirelessly received from the external power source by wireless charging technology.

The touch screen 171 may display a User Interface (UI) corresponding to each of a variety of services (for example, a call, data transfer and the like) for the user, based on an Operating System (OS) of the terminal. The touch screen 171 may transfer an analog signal corresponding to at least one touch entered on the UI, to the touch screen controller 172. The touch screen 171 may receive at least one touch made by a user's body (for example, fingers including the thumb) and/or a touch input means (for example, a stylus pen).

The touch screen 171 may be implemented in, for example, a resistive type, a capacitive type, an infrared type, or an acoustic wave type of touch screen.

The touch screen controller 172 controls output values of the touch screen 171 so that the display data provided from the controller 110 may be displayed on the touch screen 171. The touch screen controller 172 converts analog signals received from the touch screen 171 into digital signals (for example, X and Y coordinates), and transfers them to the controller 110. The controller 110 may control the touch screen 171 using the digital signals received from the touch screen controller 172. For example, in response to a touch event or a hovering event, the controller 110 may select or execute a shortcut icon (not shown) displayed on the touch screen 171. The touch screen controller 172 may be incorporated into the controller 110.

Figure 2:
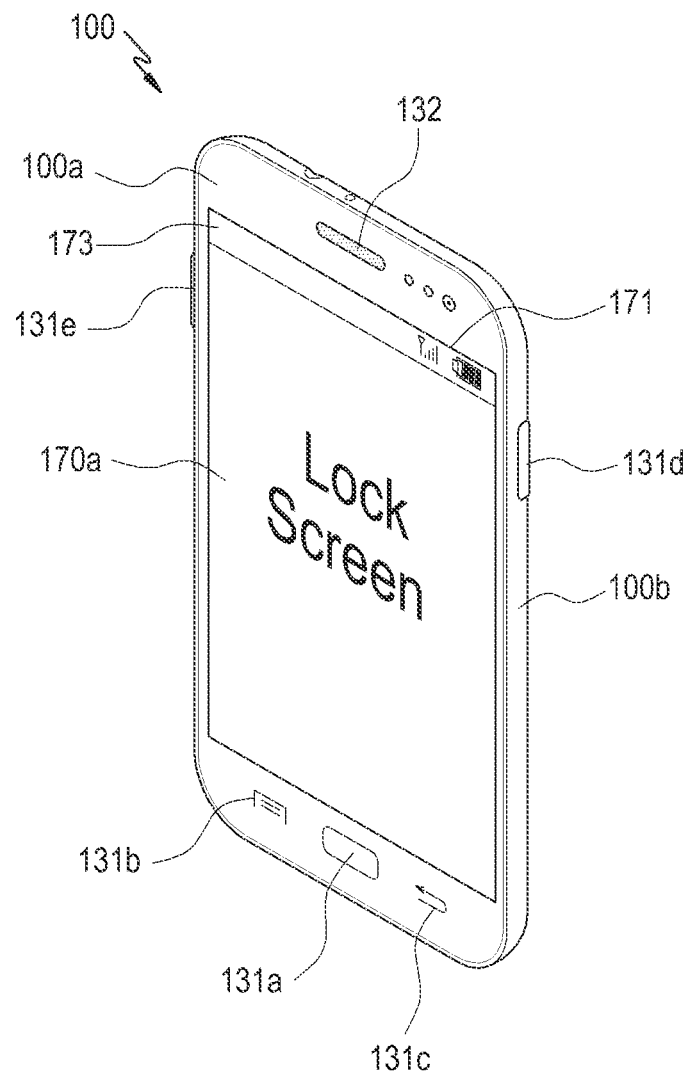
FIG. 2 is an example of a front perspective view of a mobile device, to which an IM sending/receiving method according to an embodiment of the present disclosure.
Figure 3:
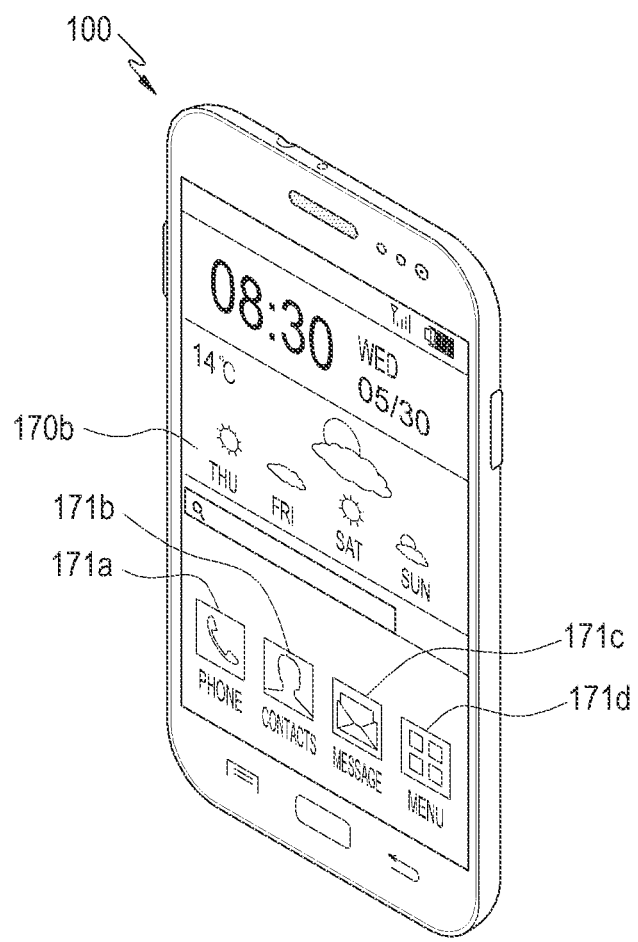
FIG. 3 is another example of a front perspective view of a mobile device, to which an IM sending/receiving method according to an embodiment of the present disclosure.

FIGS. 2 and 3 are front perspective views of a mobile device, to which a webpage providing method according to an embodiment of the present disclosure.

Referring to FIG. 2, the touch screen 171 is disposed in the center on the front 100*a* of the device 100. The touch screen 171 is formed large enough to occupy most of the front 100*a* of the device 100. In the example of FIG. 2, a lock screen 170*a* is displayed on the touch screen 171. The lock screen 170*a* is the first (or initial) screen that is displayed on the touch screen 171 when the device 100 is powered on, and this screen is a screen providing an environment in which the user may access the device 100 by entering security information (for example, a password, a security pattern and the like) that is set by the user in advance. Therefore, the controller 110 releases or unlocks the lock screen after determining the validity of the security information (for example, a password, a security pattern and the like) that is entered by the user, and switches to the home screen 170*b* in FIG. 3.

The lock screen 170*a* may be configured to receive a password or a security pattern entered by the user, and may also be configured such that if the user does not set separate security information, the lock screen 170*a* may switch to the home screen 170*b* in response to a touch input or a drag input by the user without receiving the password or security pattern.

The home screen 170*b* may include different home screens of multiple pages. Among the home screens of multiple pages, the first home screen may be a main home screen. On the home screen 170*b* may be displayed shortcut icons 171*a*, 171*b* and 171*c* for executing the frequently-used applications, a switch-to-main menu key 171*d*, the time, the weather and the like. The switch-to-main menu key 171*d* is used to display a menu screen on the touch screen 171. On an upper part of the touch screen 171 may be formed a status bar 173 that indicates the status of the device 100, such as the battery charge status, the received signal strength, the current time, and the volume operation mode.

Under the touch screen 171 may be formed a home button 131*a*, a menu button 131*b* and a back button 131*c*.

Basically, the home button 131*a* is used to display the main home screen on the touch screen 171. For example, if the home button 131*a* is touched or pressed by the user while any home screen different from the main home screen or a menu screen is being displayed on the touch screen 171, the main home screen may be displayed on the touch screen 171. If the home button 131*a* is touched while applications are being executed on the touch screen 171, the main home screen illustrated in FIG. 3 may be displayed on the touch screen 171. The home button 131*a* may be used to display the recently used applications on the touch screen 171, or to display a task manager on the touch screen 171.

The menu button 131*b* provides connection menus that can be used on the touch screen 171. The connection menus may include a widget add menu, a wallpaper change menu, a search menu, an edit menu, a preferences menu, and the like.

The back button 131*c* may be used to display the screen that was executed or displayed just before the currently displayed screen, or may be used to terminate the most recently used application.

The speaker 132 may be disposed in the upper center on the front 100a of the device 100. On sides 100b of the device 100 may be disposed, for example, a power/reset button 131d, a volume button 131e and the like.

Although it is assumed in an embodiment of the present disclosure that the device 100 has as a display device the touch screen 171 that includes a display panel for outputting display signals and a touch screen panel capable of detecting user's inputs, and also has the touch screen controller 172 for controlling the touch screen 171, it is not intended to limit the scope of the disclosure thereto. It will be apparent to those of ordinary skill in the art that the device 100 may be configured to have only the display panel as a display device, and to have a separate input means, for example, the keypad 134.

The methods according to various embodiments of the present disclosure may be implemented in the form of computer-executable program commands and recorded in non-transitory computer-readable media. The non-transitory computer-readable media may include program commands, data files, data structures and the like separately or in combination. The program commands recorded in the media may be the program commands which are specially designed and configured for the present disclosure, or may be the program commands which are known to those of ordinary skill in the field of computer software.

The methods according to embodiments of the present disclosure may be implemented in the form of program commands and stored the storage 150 of the device 100, and the program commands may be temporarily stored in the RAM 113 embedded in the controller 110, for execution of the methods. Accordingly, in response to the program commands implementing the methods, the controller 110 may control the hardware components included in the device 100, temporarily or permanently store in the storage 150 data generated while executing the methods, and provide UIs needed to execute the methods, to the touch screen controller 172.

In the below-described Instant Message (IM) sending/receiving method according to an embodiment of the present disclosure, and a detailed structure of an apparatus to which the method is applied, the IM is messaging data sent/received between a sending terminal and a receiving terminal, and may include string data and media data (for example, voice, image, video and the like).

In an embodiment of the present disclosure, the IM may include messages which are sent/received based on the Internet, and messages which are sent/received based on the mobile communication networks, such as Short Message Service (SMS) messages, Long Message Service (LMS) messages, Concatenated SMS (CSMS) messages, and Multimedia Messaging Service (MMS) messages.

Although it is assumed in an embodiment of the present disclosure that a mobile terminal (for example, a mobile communication terminal, a tablet PC and the like) is considered as a sending terminal and a receiving terminal, which send and receive an IM, it will be apparent to those of ordinary skill in the art that the sending terminal and the receiving terminal may include a desktop PC, a laptop computer and the like, given that the IM is a message that is sent and received over the Internet.

A device, to which an IM sending/receiving method is applied, may be included in the controller 110 of the mobile device illustrated in FIG. 1.

Figure 4:
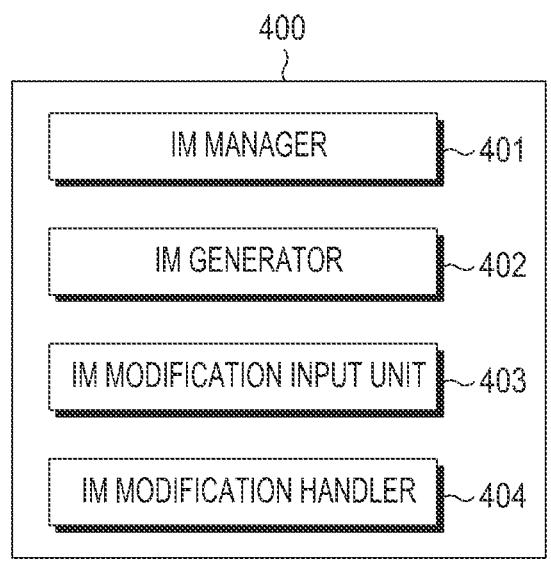
FIG. 4 is a block diagram illustrating a structure of an IM sending apparatus according to an embodiment of the present disclosure.
Figure 5:
FIG. 5 illustrates an example of a message packet for carrying an IM sent by an IM sending apparatus according to an embodiment of the present disclosure.

FIG. 4 is a block diagram illustrating a structure of an IM sending apparatus according to an embodiment of the present disclosure. FIG. 5 illustrates an example of a message packet for carrying an IM sent by an IM sending apparatus according to an embodiment of the present disclosure. FIGS. 6A, 6B, 6C, and 6D illustrate display screens provided by an IM sending apparatus according to an embodiment of the present disclosure. FIG. 7 illustrates another example of a message packet for carrying an IM sent by an IM sending apparatus according to an embodiment of the present disclosure.

Referring to FIG. 4, an IM sending apparatus 400 includes an IM manager 401, an IM generator 402, an IM modification input unit 403, and an IM modification handler 404.

The IM manager 401 is configured to control and manage an IM operation. In particular, upon determining that an IM application is selected by a user, the IM manager 401 displays an IM, and provides functions such as IM creation, deletion, search and the like. Upon detecting reception of an IM from the outside, the IM manager 401 indicates the reception of an IM on a display, and stores the received IM in a predetermined storage area.

If an IM generation menu is selected, the IM generator 402 starts its operation, and provides an environment where the user can create or write recipient information of an IM and messaging data to be included in the IM. In addition, the IM generator 402 may provide an IM send button. If the IM send button is entered, the IM generator 402 generates a message packet (see FIG. 5) for carrying an IM, and requests the communication module 120 or a sub-communication module (not shown) to send the generated message packet. The message packet may include a message IDentifier (ID) 501 by which the message can be identified, and IM data 503. The IM data 503 may include the transmission time of the IM, the size of messaging data included in the IM, the messaging data, the recipient information and the like.

The IM modification input unit 403 provides an environment where the user can modify the IM which was generated and sent by the IM generator 402. For example, if the user selects a sent IM (601 in FIG. 6A) while an IM(s) is displayed (see FIG. 6A), the IM modification input unit 403 may provide a message input window (603 in FIG. 6B) where the user modifies messaging data of the selected IM.

Figure 6A:
FIGS. 6A, 6B, 6C, and 6D illustrate display screens provided by an IM sending apparatus according to an embodiment of the present disclosure.
Figure 6B:
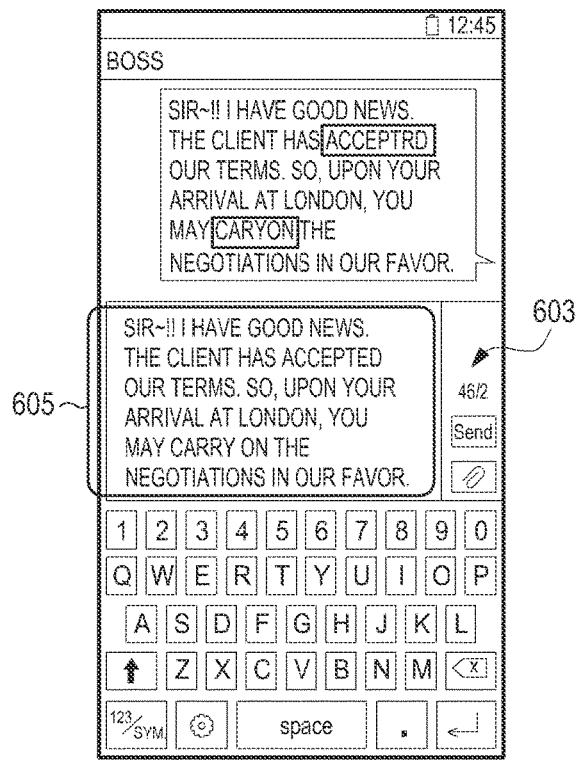
Figure 6C:
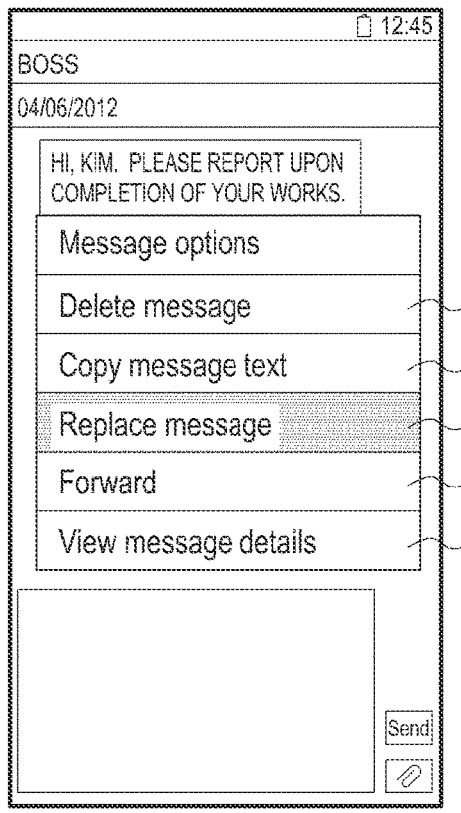
Figure 7:
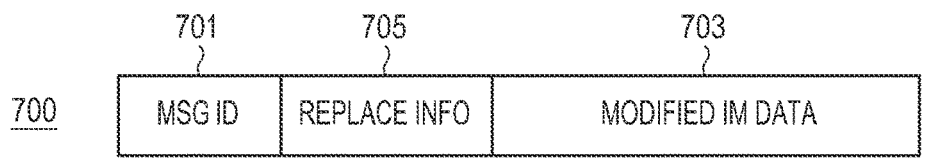
FIG. 7 illustrates another example of a message packet for carrying an IM sent by an IM sending apparatus according to an embodiment of the present disclosure.

In addition, if the sent IM is selected, the IM manager 401 provides a list of IM management options, for example, as illustrated in FIG. 6C, an option 611 of deleting the IM, an option 612 of copying the IM, an option 613 of replacing (or modifying) the IM, an option 614 of forwarding the IM, an option 615 of viewing (or displaying) details of the IM, and the like. If the option 613 modifying the IM is selected by the user, the IM manager 401 activates the IM modification input unit 403, and the IM modification input unit 403 may provide the message input window 603.

The sent IM may be selected, as the user long-touches the sent IM for a predetermined time or more, or multi-touches the sent IM a predetermined times or more.

The messaging data (605 in FIG. 6B) modified by means of the IM modification input unit 403 is provided to the IM modification handler 404, and the IM modification handler 404 applies the modified messaging data to the sent IM. Specifically, the IM modification handler 404 checks the message identifier 501 of the sent IM, generates a change message packet (700 in FIG. 7) including the modified messaging data 605 using the checked message identifier 501, and then requests the communication module 120 to send the change message packet 700 to a receiving terminal. The IM modification handler 404 configures the change message packet 700 such that the change message packet 700 may include a message identifier 701 configured to be the same as the identifier of the sent IM, and modified IM data 703 including the modified messaging data 605.

As the IM modification handler 404 configures the message identifier 701 included in the change message packet 700 to be the same as the identifier of the sent IM, the receiving terminal may receive the same message identifier 701 as the identifier of the sent IM, thereby recognizing the presence of a modification of messaging data included in the message packet.

The change message packet may further include information (i.e., replace information 705) indicating the presence of a modification of the messaging data. Thus, the receiving terminal may recognize the presence of a modification of the messaging data included in the message packet, by checking the replace information 705.

As such, since the message identifier 701 included in the change message packet 700 is configured to be the same as the identifier of the sent IM, the receiving terminal may simply recognize the modification of messaging data without the complex operation or configuration of checking the change message packet 700.

As the IM sending apparatus according to an embodiment of the present disclosure sends the modified IM data 605 to the receiving terminal using a change message packet, the transmission time of the IM may be set as the time at which the sent IM was sent. Thus, even though the details of the messaging data of the sent IM is changed to the details included in the modified messaging data 605, the sending terminal and the receiving terminal may not affect the reception time of the IM. Therefore, the details of the IM may be modified stably.

Figure 6D:
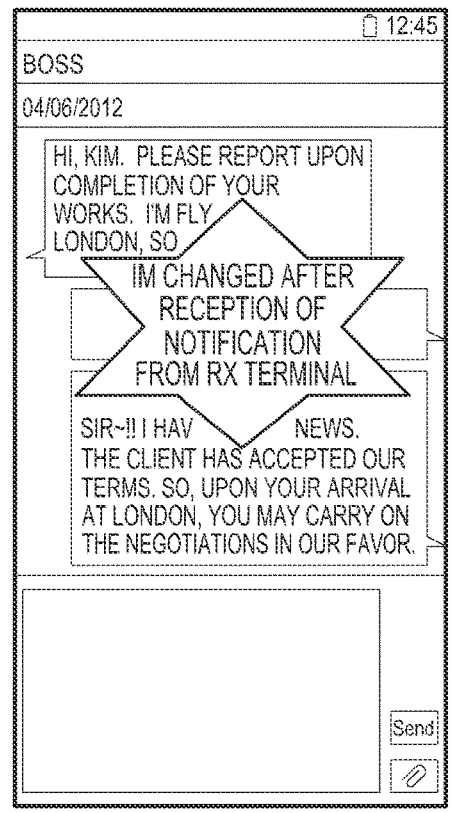

In applying the modified messaging data 605 to the sent IM 601, the IM modification handler 404 may determine or reflect whether the receiving terminal has checked the sent IM (i.e., whether a user of the receiving terminal has checked or read the sent IM), and reflect the modified messaging data 605 in the sent IM 601 (see FIG. 6D). In other words, after sending the change message packet 700 to the receiving terminal, the IM modification handler 404 displays the modified messaging data in the area where the sent IM was located, displaying a change wait status for the modified messaging data until a notification message is received from the receiving terminal In a case where a notification message is received from the receiving terminal, if information included in the notification message indicates that the receiving terminal has not checked the sent IM, the IM modification handler 404 displays the modified messaging data in a change completion status. Even if the information included in the notification message indicates that the receiving terminal has checked the sent IM and the user of the receiving terminal has approved the change in messaging data, the IM modification handler 404 displays the modified messaging data in the change completion status. On the other hand, if the user of the receiving terminal has disapproved the change in messaging data though the receiving terminal has checked the sent IM, the IM modification handler 404 displays the modified messaging data in a change wait status (or a change unapproved status). For example, the IM modification handler 404 may display the modified messaging data by setting different colors indicating the change wait status (or change unapproved status) and the change completion status of the modified messaging data, or by generating different icons indicating the change wait status (or change unapproved status) and the change completion status in the vicinity of the modified messaging data.

Figure 8:
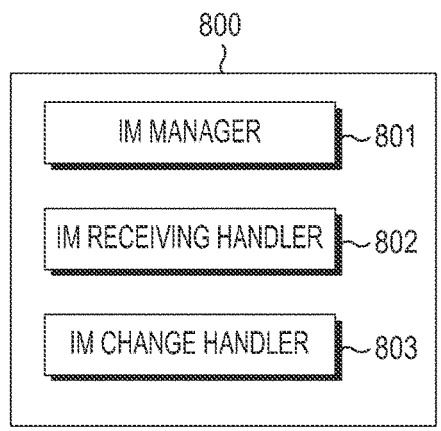
FIG. 8 is a block diagram illustrating a structure of an IM receiving apparatus according to an embodiment of the present disclosure.

FIG. 8 is a block diagram illustrating a structure of an IM receiving apparatus according to an embodiment of the present disclosure. FIGS. 9A, 9B, 9C and 9D illustrate display screens provided by an IM receiving apparatus according to an embodiment of the present disclosure.

Referring to FIG. 8, an IM receiving apparatus 800 includes an IM manager 801, an IM receiving handler 802, and an IM change handler 803.

The IM manager 801 is configured to control and manage an IM operation. In other words, upon determining that an IM application is selected by the user, the IM manager 801 displays an IM, and provides functions such as IM creation, deletion, search and the like. Upon receiving a message packet from the outside (see FIGS. 5 and 7), the IM manager 801 indicates the reception of an IM on a display, recognizing the reception of an IM, and stores the received IM in a predetermined storage area.

In particular, upon receiving a message packet (see FIGS. 5 and 7) from the outside, the IM manager 801 starts an operation of the IM receiving handler 802. The IM receiving handler 802 checks a message identifier included in the received message packet (see FIGS. 5 and 7), to determine whether the received message packet is a newly received IM, or whether the received message packet is an IM including the modified messaging data. In other words, if a message identifier of the received message packet is the same as the message identifier of the received IM, the IM receiving handler 802 determines that the received message packet is an IM including the modified messaging data. On the other hand, if a message identifier of the received message packet is different from the message identifier of the received IM, the IM receiving handler 802 determines that the received message packet is a newly received IM.

If the received message packet is a newly received IM, the IM receiving handler 802 notifies the reception of a new IM to the IM manager 801, and provides IM data to the IM manager 801 so that the IM manager 801 may store and display the IM data. On the other hand, if the received message packet is an IM including the modified messaging data, the IM receiving handler 802 provides the modified messaging data to the IM change handler 803 so that the IM change handler 803 may apply the modified messaging data to an IM.

Although based on whether a message identifier of the received message packet is the same as the message identifier of the received IM, the IM receiving handler 802 determines whether the received message packet is a newly received IM or an IM including the modified messaging data, it is not intended to limit the scope of the disclosure thereto. For example, the received message packet may further include information (i.e., replace information) indicating the presence of a modification of the messaging data, and depending on the value of the replace information, the IM receiving handler 802 may determine whether the received message packet is a newly received IM, or an IM including the modified messaging data.

Figure 9A:
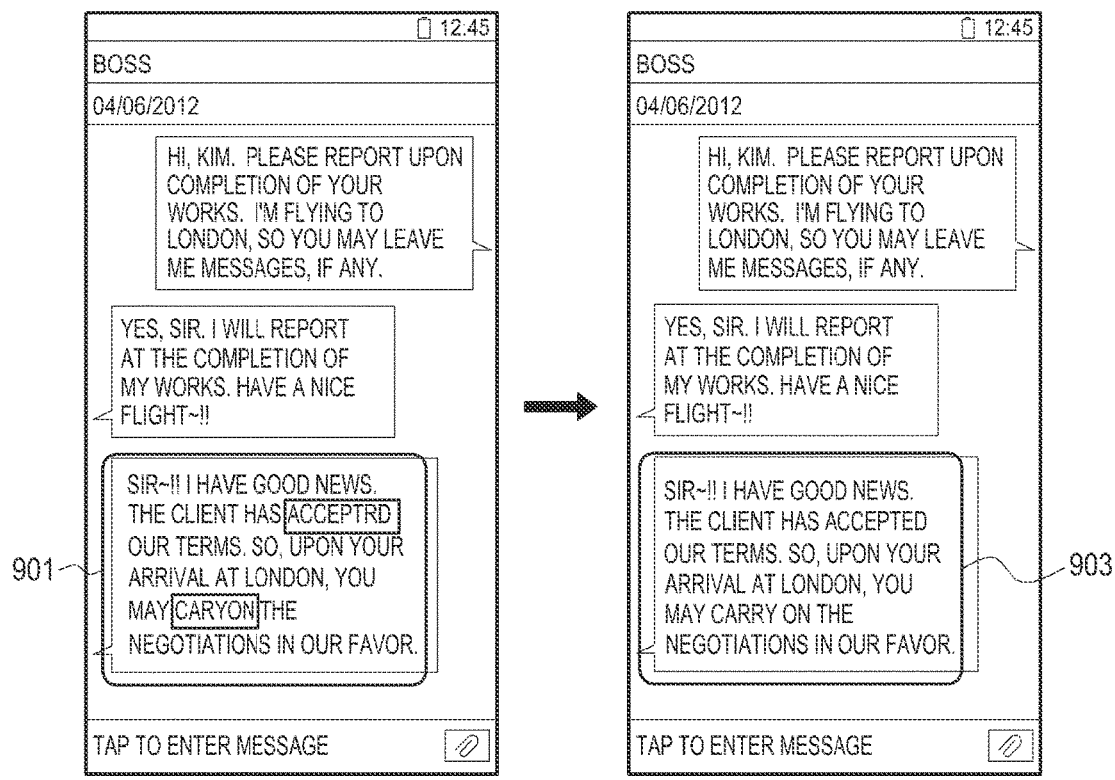
FIGS. 9A, 9B, 9C and 9D illustrate display screens provided by an IM receiving apparatus according to an embodiment of the present disclosure.
Figure 9B:
Figure 9C:
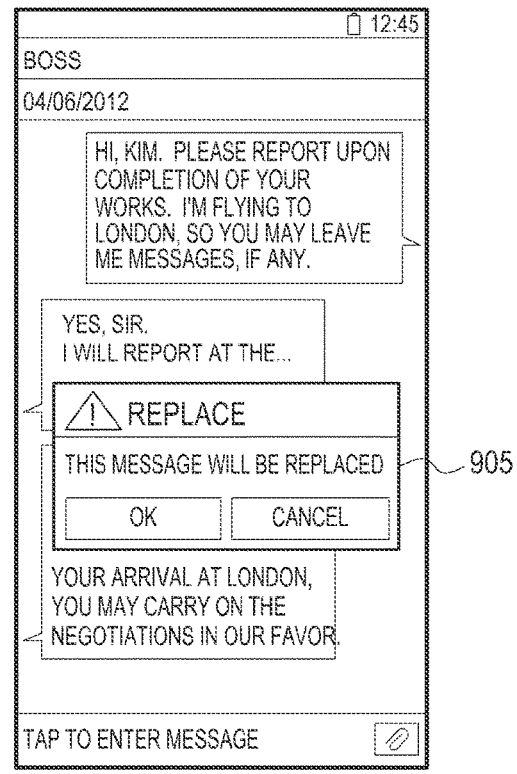

Upon receiving the modified messaging data from the IM receiving handler 802, the IM change handler 803 first determines whether the user has checked the IM including the modified messaging data. If the user has not checked the IM including the modified messaging data, the IM change handler 803 deletes the messaging data which was applied to the IM in advance, and reflects the modified messaging data in the IM. Subsequently, the IM change handler 803 provides, to the sending terminal, a notification message including information indicating that the sent IM has not been checked yet. For example, if the user has not checked the IM including the modified messaging data, the IM change handler 803, which has received the modified messaging data, may change the IM by reflecting the modified messaging data 903 in the sent IM 901 as shown in FIG. 9A.

On the other hand, if the user has checked the IM including the modified messaging data, the IM change handler 803 provides to the user an environment where the user may enter an approval for application of the modified messaging data. In other words, the IM change handler 803 provides an alarm (for example, an icon or the like) (for example, 904 in FIG. 9B) indicating the presence of the modified messaging data in the IM. As the user checks the alarm 904 indicating the presence of the modified messaging data (for example, as the user touches an associated icon), the IM change handler 803 is approved to apply the modified messaging data, and applies the modified messaging data to the IM. Subsequently, the IM change handler 803 provides to the sending terminal a notification message including information indicating the approval for reflection of the modified messaging data. The alarm indicating the presence of the modified messaging data may be displayed until the user checks the alarm indicating the presence of the modified messaging data.

If the user checks the alarm 904 indicating the presence of the modified messaging data (for example, if the user touches an associated icon), the IM change handler 803 may display an approval window (905 in FIG. 9C) in which the user can enter an approval or disapproval for application of the modified messaging data, and through the approval window 905, the IM change handler 803 may be approved or unapproved to apply the modified messaging data.

Figure 9D:
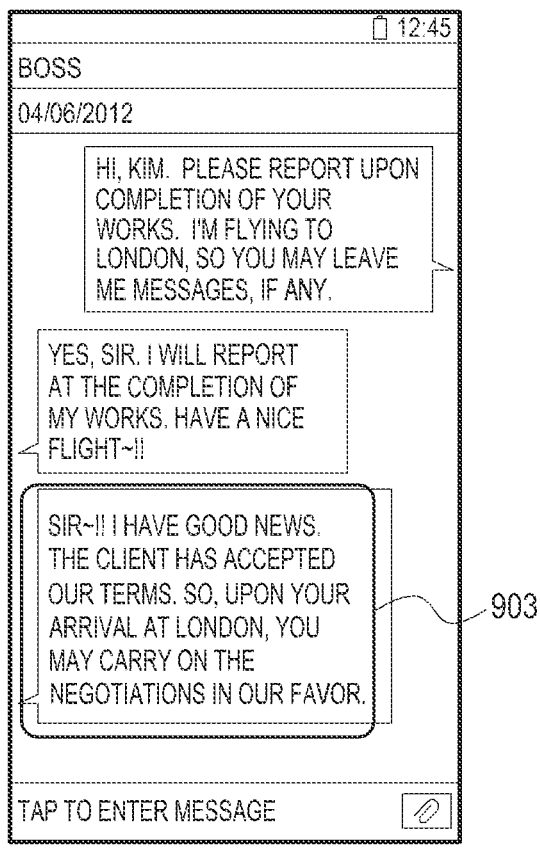

In other words, upon receiving an approval for application of the modified messaging data through the approval window 905, the IM change handler 803 displays the modified messaging data 903 by applying it to the IM (see FIG. 9D). Subsequently, the IM change handler 803 provides to the sending terminal a notification message including information indicating the approval for reflection of the modified messaging data. On the other hand, upon receiving a disapproval for application of the modified messaging data through the approval window 905, the IM change handler 803 does not apply the modified messaging data to the IM. Subsequently, the IM change handler 803 provides to the sending terminal a notification message including information indicating the disapproval for reflection of the modified messaging data.

As such, with the structure of the IM receiving apparatus according to an embodiment of the present disclosure, it is possible to simply indicate the presence of a modification of messaging data for the user of the receiving terminal, and it is also possible to reflect the modified messaging data by reflecting the intention of the user of the receiving terminal, making it possible to modify an IM stably.

Although the IM sending apparatus and receiving apparatus according to an embodiment of the present disclosure are assumed to be separate apparatuses, it is not intended to limit the scope of the disclosure thereto. It will be apparent to those of ordinary skill in the art that as illustrated in FIG. 10, the IM sending apparatus and receiving apparatus both may be included in a single terminal.

Figure 10:
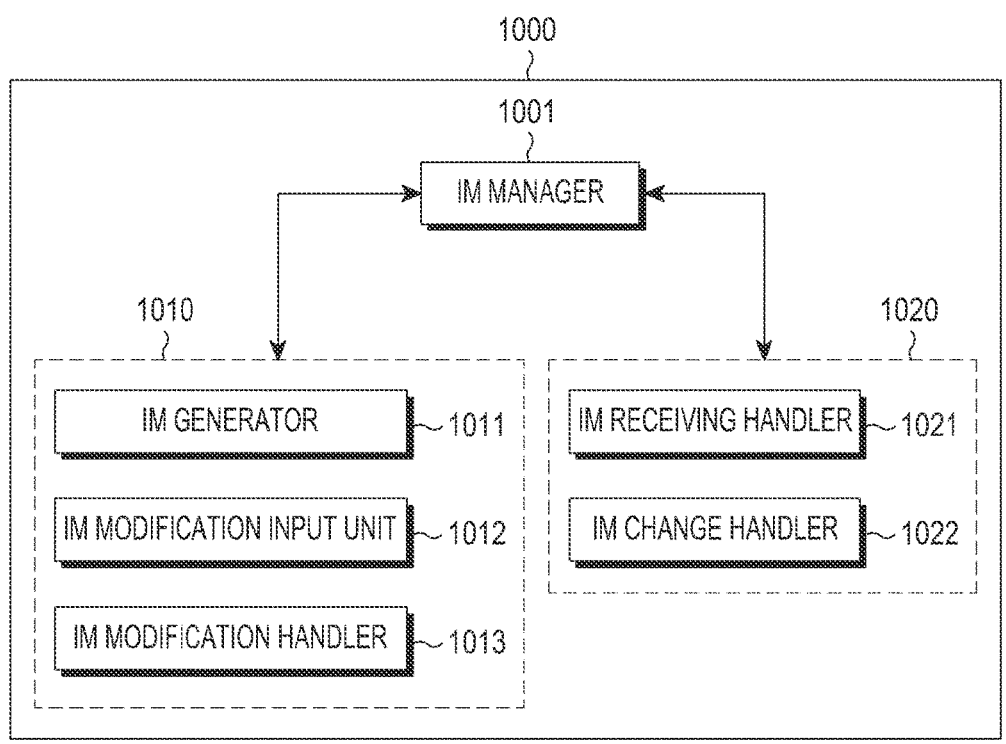
FIG. 10 is a block diagram illustrating a structure of an IM sending/receiving apparatus according to an embodiment of the present disclosure.

FIG. 10 is a block diagram illustrating a structure of an IM sending/receiving apparatus according to an embodiment of the present disclosure.

Referring to FIG. 10, an IM sending/receiving apparatus 1000 may be incorporated into the controller 110 of the mobile device illustrated in FIG. 1, and may include an IM manager 1001, an IM sending module 1010 and an IM receiving module 1020. The IM sending module 1010 may include an IM generator 1011, an IM modification input unit 1012, an IM modification handler 1013. The IM receiving module 1020 may include an IM receiving handler 1021, and an IM change handler 1022.

The IM manager 1001 may perform the functions of the IM manager 401 included in the IM sending apparatus 400 and the IM manager 801 included in the IM receiving apparatus 800. The IM manger 1001 controls operations of the IM sending module 1010 and the IM receiving module 1020 depending on the operation mode of the IM sending/receiving apparatus 1000 according to an embodiment of the present disclosure.

The IM generator 1011, the IM modification input unit 1012 and the IM modification handler 1013, which are included in the IM sending module 1010, are configured to the functions corresponding to the IM generator 402, the IM modification input unit 403 and the IM modification handler 404, which are included in the IM sending apparatus 400, respectively. The IM receiving handler 1021 and the IM change handler 1022, which are included in the IM receiving module 1020, are configured to perform the functions corresponding to the IM receiving handler 802 and the IM change handler 803, which are included in the IM receiving apparatus 800, respectively.

Figure 11A:
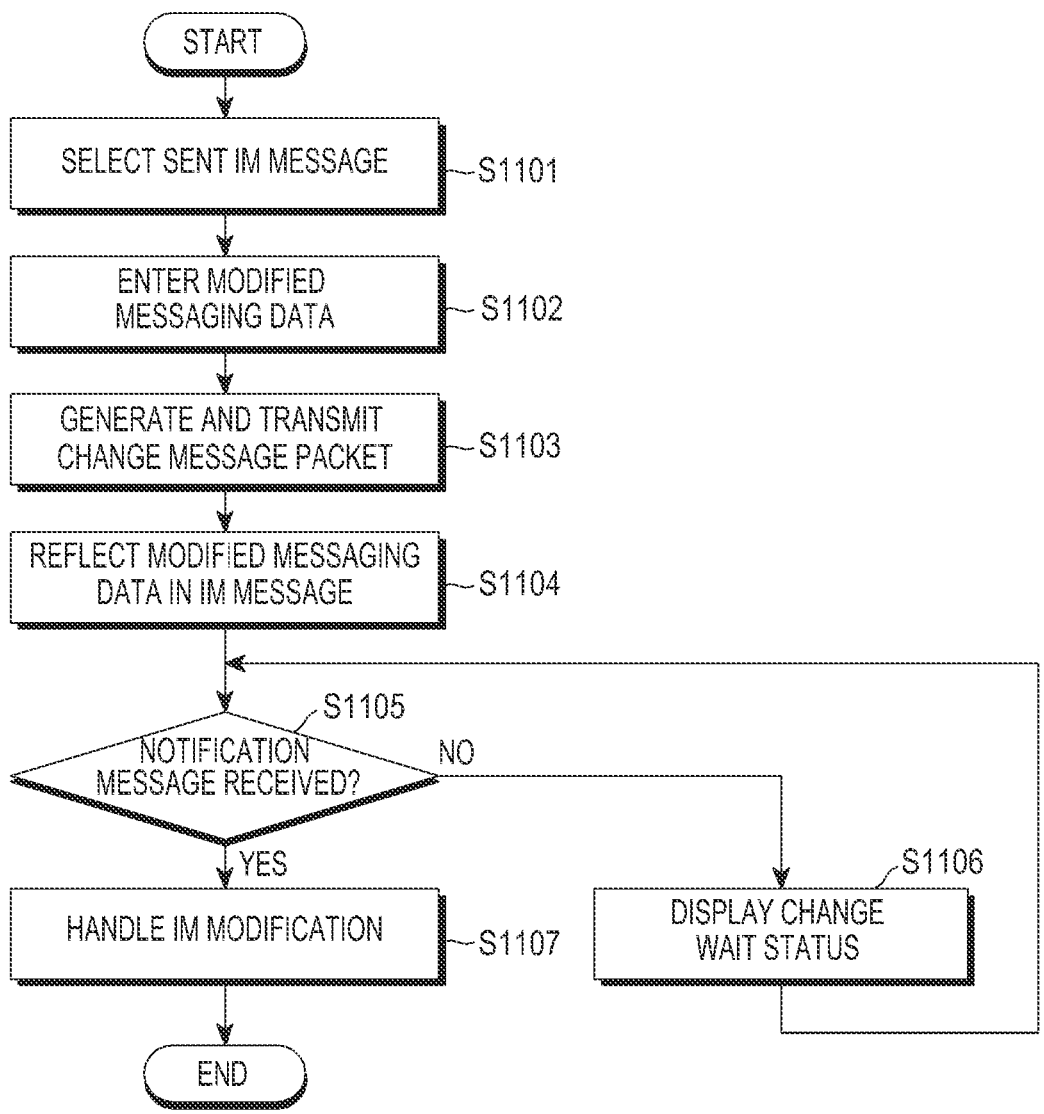
FIG. 11A is a flowchart illustrating an IM sending method according to an embodiment of the present disclosure.

FIG. 11A is a flowchart illustrating an IM sending method according to an embodiment of the present disclosure.

Referring to FIG. 11A, the IM sending method is initiated, as the user selects a sent IM (601 in FIG. 6A) in operation S1101 in an environment, which is provided by the IM modification input unit 403 and in which the user can modify an IM.

As the sent IM (601 in FIG. 6A) is selected while an IM is being displayed (see FIG. 6A), the IM modification input unit 403 provides in operation S1102 a message input window (603 in FIG. 6B) where the user modifies messaging data of the selected IM. The IM modification input unit 403 receives modified messaging data (605 in FIG. 6B) from the user. The sent IM may be selected, as the user long-touches the sent IM for a predetermined time or more, or multi-touches the sent IM a predetermined times or more.

In addition, in operation S1102, if the sent IM is selected, the IM manager 401 provides a list of IM management options, for example, as illustrated in FIG. 6C, an option 611 of deleting the IM, an option 612 of copying the IM, an option 613 of replacing (or modifying) the IM, an option 614 of forwarding the IM, an option 615 of viewing (or displaying) details of the IM, and the like. If the option 613 modifying the IM is selected by the user, the IM manager 401 activates the IM modification input unit 403, and the IM modification input unit 403 may provide the message input window 603.

Next, in operation S1103, the IM modification handler 404 receives modified messaging data (605 in FIG. 6B) from the IM modification input unit 403, generates a change message packet including the modified messaging data, and sends the change message packet to a receiving terminal. Specifically, the IM modification handler 404 checks the message identifier 501 of the sent IM, inserts the checked message identifier 501 into the field 701 in which a message identifier of a change message packet (700 in FIG. 7) is recorded, and inserts the modified messaging data into the field 703 in which IM data is recorded, generating the change message packet (700 in FIG. 7).

In operation S1104, the IM modification handler 404 reflects the modified messaging data 605 in the sent IM.

As the IM modification handler 404 configures the message identifier 701 included in the change message packet 700 to be the same as the identifier of the sent IM, the receiving terminal may receive the same message identifier 701 as the identifier of the sent IM, thereby recognizing the presence of a modification of messaging data included in the change message packet 700.

The change message packet may further include information (i.e., replace information 705) indicating the presence of a modification of the messaging data. Thus, the receiving terminal may recognize the presence of a modification of the messaging data included in the message packet, by checking the replace information 705.

Upon receiving the change message packet (700 in FIG. 7), the receiving terminal may apply the modified messaging data included in the message packet to the IM by reflecting or determining whether its user has checked the sent IM, and the sending terminal is also configured to reflect the modified messaging data 605 in the sent IM 601 by reflecting or determining whether the receiving terminal has checked the sent IM (i.e., whether the user has checked or read the sent IM). To this end, upon receiving the change message packet (700 in FIG. 7), the receiving terminal may send to the sending terminal a notification message including information indicating whether the user has checked the sent IM.

Therefore, in operation S1105, the IM modification handler 404 determines whether a notification message is received from the receiving terminal. The IM modification handler 404 displays a change wait status in operation S1106 until the notification message is received (No in operation S1105). Upon receiving the notification message (Yes in operation 1105), the IM modification handler 404 reflects in operation S1107 the modified messaging data 605 in the sent IM, by reflecting the information which is included in the notification message and indicates whether the user of the receiving terminal has checked the sent IM.

Figure 11B:
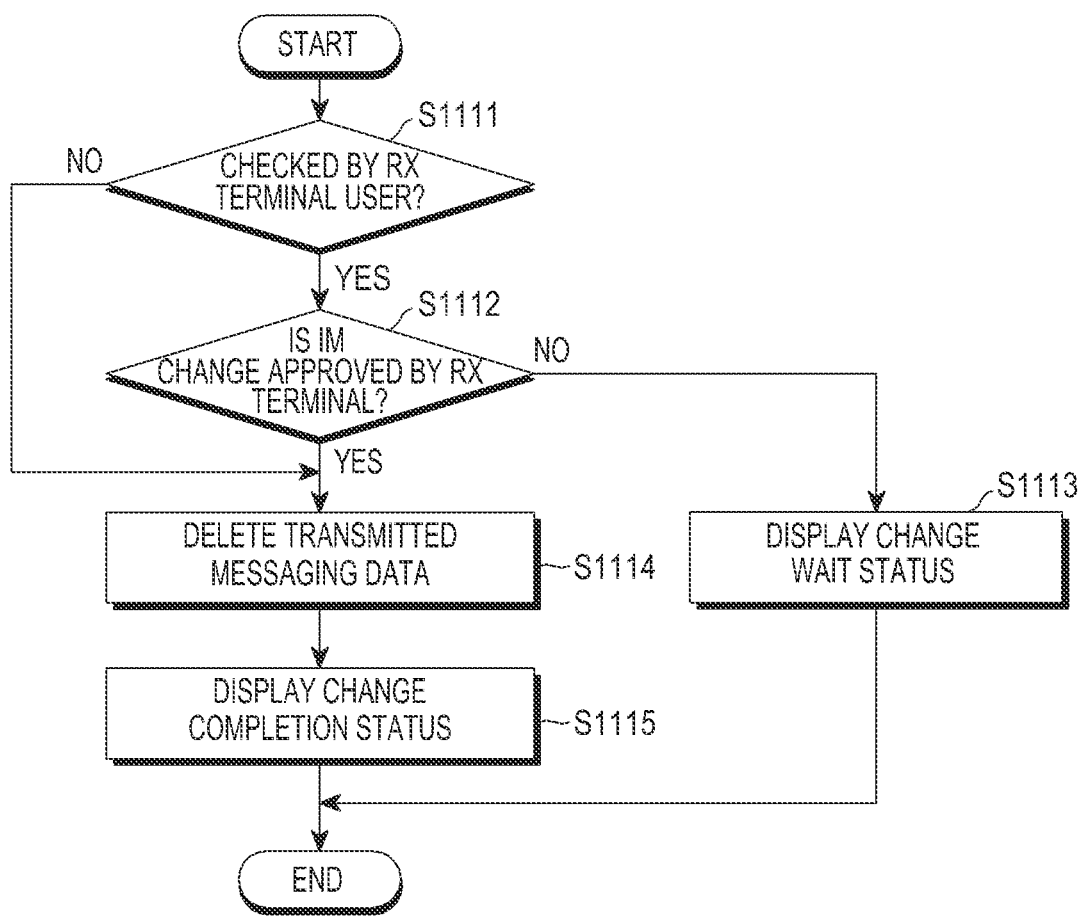
FIG. 11B is a flowchart illustrating a detailed operation of an IM modification handling process in FIG. 11A according to an embodiment of the present disclosure.

FIG. 11B is a flowchart illustrating a detailed operation of the IM modification handling process S1107 in FIG. 11A according to an embodiment of the present disclosure.

Referring to FIG. 11B, in the IM modification handling process, the IM modification handler 404 first determines whether the user of the receiving terminal has checked or read the sent IM in operation S1111. In other words, the IM modification handler 404 checks information, which is included in the notification message and indicates whether the user has checked the sent IM. If the information indicating whether the user has checked the sent IM indicates that the user has not checked the sent IM (No in operation S1111), the IM modification handler 404 proceeds to operation S1114. On the other hand, if the information indicating whether the user has checked the sent IM indicates that the user has checked the sent IM (Yes in operation S1111), the IM modification handler 404 proceeds to operation S1112.

In operation S1112, the IM modification handler 404 may further check information, which is included in the notification message and indicates whether reflection of the modified messaging data is approved or not. If the approval information indicates an approval (Yes in operation S1112), the IM modification handler 404 proceeds to operation S1114, and if the approval information indicates a disapproval (No in operation S1112), the IM modification handler 404 proceeds to operation S1113.

In operation S1113, the IM modification handler 404 displays the sent IM with the modified messaging data reflected therein, in a change wait status. On the other hand, in operation S1114, if the reflection of the modified messaging data in the sent IM has been completed, the IM modification handler 404 deletes the sent IM, since the sent IM is no longer used in the receiving terminal Subsequently, in operation S1115, the IM modification handler 404 displays the sent IM with the modified messaging data reflected therein, in a change completion status.

The IM modification handler 404 may display the modified messaging data by setting different colors indicating the change wait status (or change unapproved status) and the change completion status of the modified messaging data, or by generating different icons indicating the change wait status (or change unapproved status) and the change completion status in the vicinity of the modified messaging data.

Figure 12:
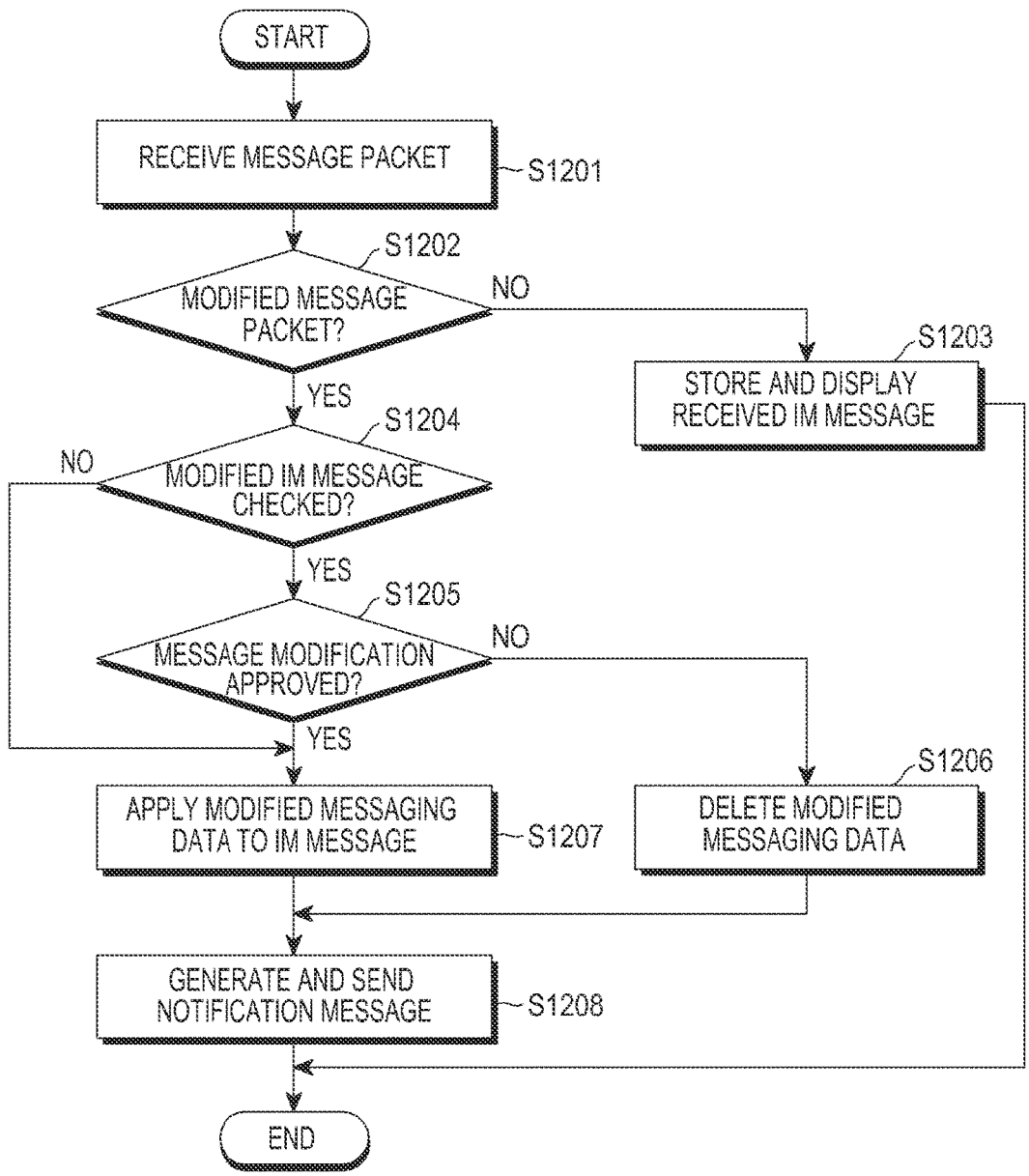
FIG. 12 is a flowchart illustrating an IM receiving method according to an embodiment of the present disclosure.

FIG. 12 is a flowchart illustrating an IM receiving method according to an embodiment of the present disclosure.

Referring to FIG. 12, the IM receiving method is initiated, as the receiving terminal receives a message packet in operation S1201. In operation S1202, the IM receiving handler 802 determines whether the received message packet is a newly received IM.

If the received message packet is a newly received IM (No in operation S1202), the IM receiving handler 802 notifies the IM manager 801 of the reception of a new IM, and if the IM receiving handler 802 provides the received IM data, the IM manager 801 stores and displays the IM data in operation S1203.

On the other hand, if the received message packet is an IM including the modified messaging data (Yes in operation S1202), the IM receiving handler 802 provides the modified messaging data to the IM change handler 803 so that the IM change handler 803 may apply the modified messaging data to the IM.

Although based on whether a message identifier of the received message packet is the same as the message identifier of the received IM, the IM receiving handler 802 determines whether the received message packet is a newly received IM or an IM including the modified messaging data, it is not intended to limit the scope of the disclosure thereto. For example, the received message packet may further include information (i.e., replace information) indicating the presence of a modification of the messaging data, and depending on the value of the replace information, the IM receiving handler 802 may determine whether the received message packet is a newly received IM, or an IM including the modified messaging data.

In operation S1204, upon receiving the modified messaging data from the IM receiving handler 802, the IM change handler 803 first determines whether the user has checked or read the IM including the modified messaging data. In other words, the IM change handler 803 provides an alarm (for example, an icon) indicating the presence of the modified messaging data in the IM. The user may read the IM including the modified messaging data, by checking an alarm indicating the presence of the modified messaging data (for example, by touching an associated icon).

If the user has not checked the IM including the modified messaging data (No in operation S1204), the IM change handler 803 proceeds to operation S1207. On the other hand, if the user has checked the IM including the modified messaging data (Yes in operation S1204), the IM change handler 803 proceeds to operation S1205.

In operation S1205, the IM change handler 803 determines if the message modification is approved. For example, the IM change handler 803 displays an approval window where the user can enter an approval or disapproval for application of the modified messaging data, and provides an environment where the IM change handler 803 can be approved or unapproved to apply the modified messaging data through the approval window. For example, the IM change handler 803 displays alarms (904 in FIG. 9B) indicating the presence of the modified messaging data, and may provide an approval window (905 in FIG. 9C) where the user may approve the application of the modified messaging data by checking the alarm 904 (for example, by touching an associated icon) indicating the presence of the modified messaging data. Upon receiving an approval for application of the modified messaging data through the approval window 905 (Yes in operation S1205), the IM change handler 803 proceeds to operation S1207. Upon receiving a disapproval for application of the modified messaging data through the approval window 905 (No in operation S1205), the IM change handler 803 proceeds to operation S1206.

As an alternative, instead of receiving an approval or disapproval for application of the modified messaging data separately from the user, the IM change handler 803 may set and store in advance an approval or disapproval for application of the modified messaging data by means of the user after setting an environment, and then approve the message modification depending on the predetermined stored value in the process (operation S1205) of performing message modification.

As the application of the modified messaging data is not approved by the user, the IM change handler 803 no longer needs to store the modified messaging data, since the modified messaging data is not reflected in the IM of the receiving terminal. Therefore, in operation S1206, the IM change handler 803 may delete the modified messaging data included in the received message packet, from the memory.

In operation S1207, the IM change handler 803 applies the modified messaging data included in the received message packet to the IM. For example, as illustrated in FIG. 9A, the IM change handler 803 reflects the modified messaging data 903 in the received IM 901.

In operation S1208, the IM change handler 803 provides to the sending terminal a notification message including the results of operations S1204 to S1205. The notification message may include information indicating whether the user has checked the sent IM, and whether the application of the modified messaging data is approved or unapproved.

Methods according to various embodiments of the present operation may be implemented in the form of computer-executable program commands and recorded in a non-transitory computer-readable media. The non-transitory computer-readable media may include program commands, data files, data structures and the like separately or in combination. The program commands recorded in the media may be the program commands which are specially designed and configured for the present disclosure, or may be the program commands which are known to those of ordinary skill in the field of computer software.

As is apparent from the foregoing description, a message may be modified based on a message ID, making it possible to easily modify the message without requiring unnecessary settings.

In addition, a message may be modified by reflecting intentions of both a user of the receiving terminal and a user of the sending terminal, making it possible to stably modify the message.

Besides, the existing message may not be deleted and the transmission/reception time of a message may not be changed, contributing to stable modification of the message.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for sending an Instant Message (IM) to a receiving terminal by a sending terminal, the method comprising:
   generating an IM including first string data that is entered by a first user of the sending terminal;
   sending the IM to the receiving terminal and displaying the IM including the first string data on a screen of the sending terminal;
   receiving a request to replace the first string data in the IM with second string data;
   sending a change of the IM including the second string data to the receiving terminal;
   receiving, from the receiving terminal, a notification message that includes information indicating whether a second user of the receiving terminal has viewed the IM and information indicating whether the change of the IM is approved by the second user of the receiving terminal;
   replacing the first string data with the second string data based on the information indicating whether the second user of the receiving terminal has viewed the IM and the information indicating whether the change of the IM is approved by the second user of the receiving terminal; and
   displaying the replaced second string data in the displayed IM,
   wherein the replacing of the first string data with the second string data comprises:
      if the second user of the receiving terminal has not viewed the IM, discarding the first string data, inserting the second string data in the IM, and displaying information indicating that the IM includes the second string data,
      if the second user of the receiving terminal has viewed the IM, determining whether the receiving terminal approves the change to the IM,
      if the second user of the receiving terminal approves the change to the IM, displaying the IM with the second string data, and
      if the second user of the receiving terminal has not approved the change to the IM, displaying information indicating that the second string data is waiting to be applied.

2. The method of claim 1, wherein the change of the IM includes an identifier for identifying the IM, information indicating a modification of the first string data, and the second string data.

3. The method of claim 1, wherein the replacing of the first string data with the second string data comprises:
   displaying information indicating that the second string data is waiting to be applied until the second user of the receiving terminal approves the change to the IM.

4. A method for receiving an Instant Message (IM) from a sending terminal by a receiving terminal, the method comprising:
   receiving an IM including first string data that is entered by a first user from the sending terminal;
   receiving a request to modify the first string data of the IM based on second string data;
   determining if a second user of the receiving terminal has viewed the IM;
   if the second user of the receiving terminal has not viewed the IM, sending a notification message to the sending terminal, replacing the first string data of the IM with the second string data, and displaying the IM having the second string data; and if the user of the receiving terminal has viewed the IM, prompting the second user of the receiving terminal to accept or reject the request to modify the first string data based on the second string data, wherein the notification message includes information indicating whether the second user of the receiving terminal has viewed the IM and information indicating whether a change of the IM is approved by the receiving terminal.

5. The method of claim 4, wherein the request to modify the first string data comprises the change of the IM including an identifier for identifying the IM, information for requesting a modification of the string data of the IM, and the second string data.

6. The method of claim 4, wherein the replacing of the first string data with the second string data comprises:

if the second user of the receiving terminal has viewed the IM, replacing the first string data with the second string data.

7. The method of claim 4, wherein the replacing of the first string data with the second string data comprises:

if the second user of the receiving terminal has viewed the IM, receiving information requesting approval of the change to the IM; and if the second user of the receiving terminal approves the change to the IM, sending information to the sending terminal indicating approval of the change to the IM.

8. The method of claim 4, wherein the replacing of the first string data with the second string data comprises:

if the second user of the receiving terminal has viewed the IM, receiving information requesting approval of the change to the IM; and if the second user of the receiving terminal disapproves the change to the IM, sending information to the sending terminal indicating disapproval of the change to the IM.

9. The method of claim 4, wherein the replacing of the first string data with the second string data comprises:

indicating a request to change the IM until the second user of the receiving terminal approves the change to the IM.

10. An apparatus for sending an Instant Message (IM) to a receiving terminal, the apparatus comprising:

a transceiver; and a processor configured to:

generate an IM including first string data that is entered by a first user of the apparatus, receive a request to replace the first string data in the IM with second string data and send a change of the IM including the second string data to the receiving terminal, receive, through the transceiver, a notification message from the receiving terminal, wherein the notification message includes information indicating whether a second user of the receiving terminal has viewed the IM and information indicating whether the change of the IM is approved by the receiving terminal, replace the first string data with the second string data based on the information indicating whether the second user of the receiving terminal has viewed the IM and the information indicating whether the change of the IM is approved by the second user of the receiving terminal, and display the replaced second string data in the displayed IM, wherein, when the processor replaces the first string data with the second string data, the processor is further configured to:

if the second user of the receiving terminal has not viewed the IM, discard the first string data, insert the second string data in the IM, and display information indicating that the IM includes the second string data, if the second user of the receiving terminal has viewed the IM, determine whether the receiving terminal approves the change to the IM, if the second user of the receiving terminal approves the change to the IM, display the IM with the second string data, and if the second user of the receiving terminal has not approved the change to the IM, display information indicating that the second string data is waiting to be applied.

11. The apparatus of claim 10, wherein the change of the IM includes an identifier for identifying the IM, and the second string data.

12. An apparatus for handling an Instant Message (IM) received from a transmitting terminal, the apparatus comprising:

a processor configured to:

receive an IM including first string data that is entered by a first user of the transmitting terminal, receive second string data for the IM, determine if the IM has been viewed by a second user of the apparatus, if the IM has not been viewed by the second user of the apparatus, send a notification message to the transmitting terminal, replace the first string data of the IM with the second string data, and display the IM having the second string data, and if the IM has been viewed by the second user of the apparatus, prompt the second user of the apparatus to accept or reject a request to modify the first string data based on the second string data; and a display configured to output the IM, wherein the notification message includes information indicating whether the second user of the apparatus has viewed the IM and information indicating whether a change of the IM is approved by the apparatus.

* * * * *